United States Patent [19]

Koebner

[11] 4,151,160
[45] Apr. 24, 1979

[54] PROCESS FOR THE SEPARATION OF UNSAPONIFIABLE CONSTITUENTS FROM TALL OIL FATTY ACIDS

[76] Inventor: Adolf Koebner, The Retreat, St. Bees, Cumbria CA27 OBY, England

[21] Appl. No.: 854,035

[22] Filed: Nov. 22, 1977

[51] Int. Cl.$^2$ .......................... C09F 1/02; C11B 13/00; C11C 1/10
[52] U.S. Cl. .................................. 260/97.6; 260/97.7; 260/419; 260/424
[58] Field of Search .............................. 260/97.6, 97.7

[56] References Cited

U.S. PATENT DOCUMENTS

| | | | |
|---|---|---|---|
| 2,317,797 | 4/1943 | Oliver et al. ........................ | 260/97.7 |
| 2,515,739 | 7/1950 | Smerechniak et al. ............. | 260/97.7 |
| 2,894,939 | 7/1959 | Hampton ........................... | 260/97.7 |

FOREIGN PATENT DOCUMENTS

| | | | |
|---|---|---|---|
| 498717 | 12/1953 | Canada ..................................... | 260/97.6 |
| 596904 | 4/1960 | Canada ..................................... | 260/97.7 |

Primary Examiner—H. S. Cockeram
Attorney, Agent, or Firm—Young & Thompson

[57] ABSTRACT

The unsaponifiable constituents and fatty acids contained in tall oil are separated by a process in which the fatty acids are converted into low melting soaps which are soluble in the unsaponifiable constituents and such constituents then distilled from a homogeneous medium. Thereafter, the fatty acids can be recovered by distillation after saponification of said low melting soaps.

6 Claims, No Drawings

PROCESS FOR THE SEPARATION OF UNSAPONIFIABLE CONSTITUENTS FROM TALL OIL FATTY ACIDS

This invention relates to a process for the separation of mixtures of fatty acids and unsaponifiable constituents which are contained in tall oil. In particular, the invention is concerned with the fraction known as tall oil heads which comprises mixtures of fatty acids and unsaponifiable constituents which because of their similar boiling range cannot be separated as such by a process of fractional distillation.

Crude tall oil is a commercial by-product of the Kraft paper industry. It contains fatty and rosin acids and variable amounts of unsaponifiable constituents. The separation and purification of fatty acids and rosin acids is carried out commercially and tall oil is a valuable source of these acids. However, the separation of fatty acids from the unsaponifiable constituents contained in the initial or head fraction is difficult since the unsaponifiable constituents co-distil to a large extent with the fatty acids. As a consequence, it has been the usual practice to discard or burn the head fraction of tall oil, particularly as the unsaponifiable constituents would apparently have no value. Similarly, fatty acids with a high unsaponifiable content constitute an undesirable by-product of no commercial value.

The head fraction of tall oil normally contains from 50-75% fatty acids and from 50-25% unsaponifiable constituents though the composition of the head fraction depends to some extent upon the composition of the crude oil from which it is derived and also to a large measure upon the distillation conditions used in its initial refining. However, the low value head fraction by-product constitutes about 10% of the crude tall oil feed.

A typical fatty acid mixture contained in the tall oil head fraction of North American origin (acid value 138) can be shown by gas/liquid chromatographic analysis to have the following composition:

| | |
|---|---|
| Acids (less than 16 carbon atoms) | 8.5% |
| Palmitic acid | 35.9% |
| Palmitoleic acid | 8.5% |
| Acids (with 17 carbon atoms) | 1.4% |
| Stearic acid | 1.0% |
| Oleic acid | 23.1% |
| Linoleic acid | 17.8% |
| Linoleic acid (cis-8, trans-11) | 0.4% |
| Linoleic acid (trans-8, trans-11) | 0.4% |
| Unidentified unsaturated acids | 2.9% |
| Eicosanoic acid | 0.1% |
| | 100% |

It will be seen that if there were a practical method available to separate the unsaponifiable constituents from the acids contained in tall oil head fractions a new source of valuable fatty acids would be obtained.

Also in my U.S. Pat. No. 4,019,921 I have shown that the unsaponifiable constituents of tall oil and in particular the unsaponifiable constituents contained in the tall oil heads after having been freed from fatty acids can be used as a starting material for the preparation of a synthetic paper size.

Moreover, in my U.S. Pat. No. 3,654,255 I have described a method of isolating and recovering unsaponifiable fractions from whole tall oil or from tall oil fractions as a preliminary step in a non-fractional distillation method of separating rosin and fatty acids.

It is an object of the present invention to provide an improved method whereby both the unsaponifiable constituents and the fatty acids from tall oil can be separated and, in particular, whereby the unsaponifiable constituents and the fatty acids which co-distil in the head fraction of tall oil can be separated from each other both conveniently and advantageously.

I have now discovered that the unsaponifiable constituents can be completely separated from the fatty acids if the fatty acids contained in the tall oil head fraction are first converted to the normal and or basic soaps of zinc or lead, whereby lead is the less preferred cation. Conversion of fatty acids to their basic soaps, and particularly to their zinc soaps is especially advantageous. This is because I have found that these soaps and mixtures thereof have low melting points and that in their molten state they form homogeneous solutions in the unsaponifiable constituents and that such solutions have a low viscosity. These properties are such to enable the unsaponifiable constituents to be removed from the molten soaps by vacuum distillation without the need to heat the mixture to excessively high temperatures to maintain the product in a liquid state.

It is well known that the heating of fatty acid soaps normally results in an intermolecular condensation to produce ketones. However, it also has surprisingly been found that this expected ketonisation reaction does not occur under conditions in which the unsaponifiable constituents can be removed from the molten fatty acid soaps by vacuum distillation from a homogeneous mixture. It will, of course, be appreciated that distillation from a heterogeneous mixture containing both liquid and solid phases poses considerable technical difficulties such as carry-over, bumping and coating of heat exchange surfaces leading to reduction of heat transfer efficiency, overheating and charging of material. Such heterogeneous reaction mixtures would be obtained if, for example, mixtures of sodium or potassium soaps of the fatty acids in the unsaponifiable constituents were to be subjected to distillation conditions. Thus, the facility provided by the present invention of a homogeneous mixture of fatty acid soaps and unsaponifiable constituents has very considerable advantages in permitting the subsequent step of vacuum distillation to be carried out.

If it is desired to recover the fatty acid constituents as well as the unsaponifiable constituents the zinc or lead soaps obtained as a residue after removing by vacuum distillation the unsaponifiable constituents may then be decomposed by the addition of mineral acid such as hydrochloric, sulphuric or nitric acid to liberate fatty acids and form appropriate salts of zinc or lead. Such salts in aqueous solution may be re-cycled to the process as such or in the form of their oxides, hydroxides, basic carbonates or carbonates and the liberated fatty acids can be recovered and, if desired, purified by vacuum distillation.

Accordingly, the present invention provides a process for the separation of fatty acids from the unsaponifiable constituents of tall oil and, in particular, from tall oil head fractions into fatty acids of low unsaponifiable content and into the unsaponifiable constituents of zero acid value which process consists essentially of:

A process for the separation of fatty acids from the unsaponifiable constituents of tall oil, which process consists essentially of:

1. Treating the mixture of fatty acids and unsaponifiable constituents contained in a head fraction of tall oil with a source of metal cations selected from the group consisting of zinc, lead and mixtures thereof in a molar ratio of fatty acid to metal of from 1:1 to 2:1 and at a sufficient temperature to obtain a homogeneous solution of metal soaps in the unsaponifiable constituents;

2. removing the unsaponifiable constituents by vacuum distillation of said homogeneous solution at a temperature below 250° C.; and, if desired, 3. treating in an aqueous solution the residual metal soaps with a slight excess of an acid which is a stronger acid than the fatty acids at a temperature whereat the liberated fatty acids may be separated from the aqueous phase as an oily layer; and if desired, purifying said liberated fatty acids by vacuum distillation.

The preferred starting material for the separation process of the invention is the initial or forerun fraction which results when crude tall oil, which often contains 5-10%, but may contain up to 25% unsaponifiable constituents, is distilled under reduced pressure. This fraction contains the unsaponifiable components mixed with fatty acids. The mixture normally contains 30-70% of each of these two types of components.

The first step of the process of the invention is the conversion of the fatty acids contained in the head fraction into their zinc or lead soaps, or mixtures of these soaps, in the presence of the unsaponifiable constituents. This soap/salt formation can be achieved by two methods. The first method consists of heating the tall oil fraction with an oxide, hydroxide, basic carbonate, carbonate or acetate of one or a mixture of the claimed metals to a temperature between 100° and 160° C. Water, water and carbon dioxide or acetic acid are evolved. It has been found that there then results a homogeneous solution of soaps in the unsaponifiable constituents and that this solution has a low viscosity. This is particularly the case when basic soaps are formed and especially when the zinc soaps are formed in this first step of the process of the invention.

Alternatively, the tall oil fraction may be neutralized in an aqueous system with the stoichiometric amount of an alkali such as sodium hydroxide, potassium hydroxide or ammonia. The corresponding carbonates may also be employed. Thus, on the addition of a water soluble salt of zinc or lead, or a mixture of such salts, a reaction of double decomposition occurs. Suitable salts for this purpose are the chloride, sulphate, nitrate and or acetate to the extent that these are sufficiently water soluble. This double decomposition results in the formation of metal soaps. Though these are insoluble in water they readily dissolve in the unsaponifiable constituents if necessary after mild heating. The resultant mixture separates into two distinct phases, the upper phase consisting of the metallic soaps dissolved in the oily unsaponifiable constituents and the lower, aqueous phase containing the readily water soluble salts such as sodium chloride, ammonium sulphate, potassium acetate etc. This lower layer is then discarded.

In either of these methods the zincc or lead cation may either be added in a molar ratio of fatty acid to metal of 2:1 in order to form the normal soaps or of 1:1 in order to form the basic soaps. Intermediate ratios can, of course, also be used to form mixtures of the normal and basic soaps. It is in fact preferred to make the basic soaps because I have found that these soaps, especially the basic zinc soaps of the fatty acid component of tall oil heads have an even lower melting point than the normal soaps, thereby permitting the whole process and in particular the distillation step and the step of soap decomposition in aqueous medium to be carried out at low temperatures whilst still maintaining the product in a liquid state. For example, I have found that the basic zinc soaps formed from equal molecular proportions of zinc oxide and the fatty acid constituents of tall oil head have a melting point of 45° C. This soap was also found to be soluble in toluene which indicates that the basic soaps are, indeed, formed and that the material is not a mixture of the normal soaps and excess zinc oxide.

The second step of the process of the invention is the separation of the unsaponifiable constituents from the dissolved metal soaps by a process of vacuum distillation. For this step the solution of soaps in the unsaponifiable constituents obtained in the above described manner for the first step of the process of the invention is heated in vacuo by gradually increasing the temperature and lowering the pressure. It is then found that the unsaponifiable constituents distil from the non-volatile soaps and that this can readily be carried out at a temperature of the distillation residue not exceeding 250° C. In this manner it is found that the decomposition of the soaps by the ketonization reaction is substantially avoided. A vacuum of from 20 to 1 mm Hg is normally found to be sufficient. In this manner up to 99% of the unsaponifiable constituents may be removed from the soaps whilst these remain in the liquid state and without significant ketonisation of the soap occurring.

Although not essential, the injection of live steam into the distillation flask facilitates the complete removal of the unsaponifiable constituents from the soaps and suppresses degradation and polymerisation side reactions. There is thus obtained a yellow to amber distillate composed of the unsaponifiable constituents having a boiling range of 60°-160° C. at 1 mm Hg. This product is suitable for further processing, for example, in the preparation of paper sizes as described in my U.S. Pat. No. 4,019,921.

The non-volatile soaps remaining as distillation residue are obtained as low melting solids which can readily be handled in the form of liquids at temperatures below 100° C. and in the case of the basic zinc soaps at a temperature as low as 45°-50° C.

In a preferred feature of the invention such metal soaps are subsequently decomposed to produce a useful mixture of fatty acids which is substantially free of unsaponifiable constituents and which, if desired, can be further purified by vacuum distillation.

Thus, the process of the invention preferably also comprises the third step in which the soaps obtained as a distillation residue from the said second step of the process are treated in an aqueous medium with a slight excess of an acid which is a stronger acid than the fatty acids. Normally this third step is carried out at temperatures between 70° and 99° C. In this way the metallic soaps are decomposed to liberate the corresponding fatty acids and metal salts are formed which remain dissolved or suspended in the aqueous phase. The fatty acids, when the decomposition of the soaps is completed, separate from the aqueous phase as an upper, oily layer. This layer is readily separated by decantation and it may be finally washed with a little water.

The fatty acids thus obtained are contaminated with about 1% unsaponifiable matter and are pure enough for many technical uses. However, if desired, the fatty acid mixture may be further purified by distillation or fractional distillation to obtain an almost colourless mixture of fatty acids or selected fractions thereof, for example, a fraction of acids of 16 carbon atoms which will be predominantly palmitic acid.

The aqueous layer obtained in this splitting step of the preferred process of the invention contains dissolved or suspended metal salts. If desired this aqueous layer may be re-cycled to the first step of the process, that is, the metal soap formation step described above. This can be done without any further treatment being given to the aqueous layer. Alternately, the corresponding metal oxides, hydroxides, carbonates or basic carbonates which are insoluble in water may be precipitated from the aqueous layer by the addition of alkali metal hydroxides, carbonates or ammonia. These metalic oxides, hydroxides, carbonates or basic carbonates may then be recovered by filtration and employed without any further purification or complete drying in the said first soap formation step described above.

Each and all the stages of the process of the invention may be carried out either batchwise or continuously.

The invention will be illustrated by the following examples:

EXAMPLE 1

A tall oil head fraction (200 g., acid value 100, containing 46.7% fatty acids, 53% unsaponifiable constituents and 0.3% water) was heated to about 80° C. and zinc oxide (14.6 g.) gradually added with stirring. When all the zinc oxide had been added, the mixture was gradually heated to 160° C. with continued stirring. Water of neutralisation was removed and this procedure was completed by slowly applying a vacuum, ultimately of 25 mm Hg. At this stage the product was a homogeneous solution of low viscosity.

The vacuum was now gradually reduced to 1 mm Hg. whereupon the distillation of the unsaponifiable constituents commenced. Gradually the temperature, measured in the liquid phase contained in the distillation flask, was raised to 225° C. After 15 minutes at this temperature distillation had ceased and the process of distillation was considered complete.

The distillate of unsaponifiable constituents weighed 103 g.

The flask containing the zinc soaps was then cooled to 95° C. and the still molten zinc soaps run with vigorous agitation into a solution of concentrated sulphuric acid (17.5 g.) in water (300 c.c.) whilst maintaining the temperature of the aqueous mixture at 90°–95° C. When the decomposition of the zinc soaps was completed a pH of about 4 was reached in the aqueous phase. On standing, an upper oily layer of fatty acids was formed. The lower, aqueous phase, containing zinc sulphate (30.7 g. as $ZnSO_4$) was separated and the fatty acids washed with hot water (20 c.c.) This wash was added to the zinc sulphate solution.

The fatty acids were dried and distilled in vacuo, the distilled acids had a boiling range 140°–160° C. at 0.5 mm Hg. These acids were of a pale straw colour when molten and crystallized at room temperature to a creamy white mass. There was obtained 91 g. of fatty acids with an acid value of 213, containing 1.1% unsaponifiable matter.

Before their decomposition the zinc soaps had a melting point of 85° C. and contained 11% zinc (expressed as zinc metal).

The aqueous zinc sulphate solution which had been separated from the fatty acids was treated with sodium carbonate (19 g.). There was precipitated a hydrated zinc carbonate which could be easily filtered and washed. It was found unnecessary to dry this carbonate mixture before re-using the zinc compounds in the first step of the process because the water associated with it is removed together with the water of neutralisation during the soap formation process.

EXAMPLE 2

The process of example 1 was repeated but using zinc oxide (29.2 g.) so that the basic zinc soaps were formed instead of the normal soaps formed in example 1. The distillation of the unsaponifiable constituents from the basic zinc soaps was carried out at a temperature of 160° C. rising to 220° C. using a vacuum of 20 mm Hg. throughout but passing a stream of water vapour into the distillation mixture. The unsaponifiable constituents were condensed in a heated condenser, whilst the water vapours were passed to a cooled, second condenser. The yield of recovered unsaponifiable constituents was the same as in example 1, and had an acid value of 0.2.

The basic soaps obtained had a melting point of 45° C. and contained 19% zinc (expressed as zinc metal). This accords well with the expected zinc content of the basic soaps.

The basic soaps warmed to about 75° C. were poured into water (300 c.c.) heated to 90° C. The mixture of molten soaps and water was vigorously stirred whilst the required amount of sulphuric acid (70 g. of 50% w/w sulphuric acid) was gradually added. The temperature of the stirred reaction mixture was maintained at 80° to 90° C. until the splitting process was completed. The pH of the aqueous solution was then found to be 4.

Both the oily fatty acid phase and the aqueous phase were worked up as in example 1. There was obtained a mixture of fatty acids (92 g.) with an acid value of 214 and an unsaponifiable matter content of 0.9%.

EXAMPLE 3

A tall oil head fraction (291 g. with an acid value of 138) from a North American source was stirred and heated with water (1000 c.c.) to 85° C. Caustic soda (28.7 g.) dissolved in water (200 c.c.) was gradually added to a phenolphthalein end point. A turbid soap emulsion was produced. With continued stirring and heating to 85° C., a zinc sulphate solution equivalent in volume and concentration to that obtained in example 2 was gradually added. After the addition was completed, two phases were readily formed; the upper phase containing a solution of the normal zinc soaps in the unsaponifiable constituents; a lower aqueous layer containing sodium sulphate. After standing for half an hour the lower aqueous phase was separated and discarded. The upper zinc soap/unsaponifiable constituent layer was transferred to a distillation flask and gradually heated in vacuo to remove a small amount of water entrapped in the oily phase. When this drying procedure was completed, the unsaponifiable constituents were removed from the zinc soaps as described in example 1.

There was obtained the unsaponifiable fraction in a yield of 100 g. with a boiling range on redistillation of 60°–160° C. at 1 mm Hg. There was also obtained in a yield of 181 g. a mixture of fatty acids which after redistillation had an acid value of 215.

EXAMPLE 4

To a tall oil head fraction (200 g. acid value 138) of North American origin warmed in a flask to 75° C., lead monoxide (55 g.) was gradually added with stirring.

The formation of the normal lead soap was carried out by heating the mixture with stirring to 160° C., finally removing the last traces of water by applying a vacuum gradually down to 25 mm Hg.

The removal of the unsaponifiable constituents by distillation from the lead soaps was carried out as described in example 1. There remained finally a mixture of fatty acid lead soaps which solidified at 85° C. The lead soaps were split as described for the zinc soaps in example 1, but with the difference that in this case the splitting was carried out with nitric acid prepared by diluting concentrated nitric acid of 69% (45 g.) with an equal weight of water.

Both the fatty acids and the unsaponifiable constituents were recovered as described in the previous examples and were obtained in the same quality and with the same yield as there described.

The lead nitrate solution obtained after the splitting of the lead soaps may be recycled as described for the zinc sulphate solutions in examples 2 and 3.

I claim:

1. A process for the separation of fatty acids from the unsaponifiable constituents of tall oil, which process consists essentially of:
   A. treating the mixture of fatty acids and unsaponifiable constituents contained in a head fraction of tall oil with a source of metal cations selected from the group consisting of zinc, lead and mixtures thereof in a molar ratio of fatty acids to metal of from 1:1 to 2:1 and at a sufficient temperature to obtain a homogeneous solution of metal soaps in the unsaponifiable constituents,
   B. removing the unsaponifiable constituents by vacuum distillation of said homogeneous solution at a temperature below 250° C. and optionally,
   C. treating in an aqueous medium the residual metal soaps with a slight excess of an acid which is a stronger acid than the fatty acids at a temperature whereat the liberated fatty acids may be separated from the aqueous phase as an oily layer, and, optionally,
   purifying said fatty acids by vacuum distillation.

2. A process as claimed in claim 1 wherein said metal cations are provided in step (1) in an equimolecular amount in relation to the fatty acids present, whereby basic metal soaps are formed.

3. A process as claimed in claim 1 wherein said metal cation is zinc.

4. A process as claimed in claim 2 wherein said metal cation is zinc.

5. A process as claimed in claim 1 wherein said step (B) is carried out at a vacuum of from 25 to 1 mm Hg.

6. A process as claimed in claim 1 wherein the aqueous layer formed in step (C) is re-used in a further operation of said step (A).

* * * * *